United States Patent [19]

Shiffler et al.

[11] Patent Number: 5,242,150
[45] Date of Patent: Sep. 7, 1993

[54] ROTARY HYDRAULIC SERVO OR THROTTLE VALVE

[75] Inventors: Mark E. Shiffler, Annapolis, Md.; Luke W. Loy, Washington, D.C.

[73] Assignee: The United States of America as represented by the Secretary of the Navy, Washington, D.C.

[21] Appl. No.: 953,389

[22] Filed: Sep. 30, 1992

[51] Int. Cl.$^5$ .......................... F16K 5/10; F16K 31/04
[52] U.S. Cl. ..................... 251/209; 251/208; 251/121; 251/127; 251/129.11; 251/212
[58] Field of Search ............... 251/209, 208, 121, 207, 251/127, 129.11, 212

[56] References Cited

U.S. PATENT DOCUMENTS

| | | | |
|---|---|---|---|
| 1,015,164 | 1/1912 | Fowden | 251/209 X |
| 1,141,276 | 6/1915 | Smith | 251/209 X |
| 3,342,449 | 9/1967 | Jackson | 251/209 X |
| 3,435,897 | 4/1969 | Barrington . | |
| 3,905,275 | 9/1975 | Saida et al. . | |
| 4,660,891 | 4/1987 | Wasserka | 251/209 X |
| 4,799,514 | 1/1989 | Tanaka et al. . | |
| 4,813,749 | 3/1989 | Cilles . | |
| 4,848,402 | 7/1989 | Elser et al. . | |
| 4,850,447 | 7/1989 | Hirakushi et al. . | |
| 4,871,040 | 10/1989 | Zuraski et al. . | |
| 4,872,310 | 10/1989 | Kaye . | |
| 4,886,138 | 12/1989 | Graber et al. . | |
| 4,903,936 | 2/1990 | Kajiwara . | |
| 4,920,858 | 5/1990 | Chang . | |
| 4,951,772 | 8/1990 | Peter et al. . | |
| 4,962,678 | 10/1990 | Murano et al. . | |
| 4,964,317 | 10/1990 | Murano et al. . | |
| 4,964,612 | 10/1990 | Maggioni et al. . | |
| 4,977,816 | 10/1990 | Kuttruf . | |
| 4,986,165 | 1/1991 | Miyaoka . | |

FOREIGN PATENT DOCUMENTS 424024 2/1935 United Kingdom ................ 251/209

Primary Examiner—Arnold Rosenthal
Attorney, Agent, or Firm—Charles D. Miller

[57] ABSTRACT

A rotary servo or throttle valve comprises a housing defining a chamber and a discharge port in fluid communication with the chamber, a rotary valve spool for delivering fluid into the chamber, and a system for delivering pressurized fluid passing from the outlet opening of the valve in the chamber to the discharge port in the housing in which non-cavitating technology can be readily incorporated. The outlet opening of the valve spool is a wedge shaped groove formed in its periphery, the groove having opposed, arcuately diverging sidewalls. The diffusing system comprises an elongated member which may be rotated in the chamber to align a plurality of flow paths with the discharge port and the outlet opening. The elongated member and valve spool may be rotated independently in opposite directions to obtain faster flow rate changes.

16 Claims, 3 Drawing Sheets

ROTARY HYDRAULIC SERVO OR THROTTLE VALVE

BACKGROUND OF THE INVENTION

1. Field of the Invention

The present invention relates generally to a rotary hydraulic valve and more particularly to a rotary hydraulic valve which may be built to operate in an acoustically quiet (non-cavitating) manner.

2. Description of the Prior Art

In certain operating environments, it is desirable to minimize noise wherever possible, particularly in critical components which must be operable at all times. Where hydraulic valves are used in such environments, any cavitation of the operating fluid as it flows through the valves substantially interferes with quiet operation. Accordingly, various efforts have been made to produce servo and throttle valve which can operate hydraulic output members in a non-cavitating manner.

Previous units have been built with linear activating mechanisms. A lapped main spool reciprocates in a linear manner to open or close flow through the passages, thereby effecting changes in the flow rate. Control signals are sent to a solenoid valve or torque motor to actuate the pilot stage which in turn alters the hydraulic balance and/or the position of the main spool. Main spool linear position may be directly or indirectly related to the pilot stage.

One disadvantage of such conventional valves is that leakage flow through the pilot stage introduces hysteresis into valve response. Another disadvantage is that after a control signal is delivered to the servo valve or torque motor, sufficient pressure must build in the pilot stage before the main spool can be actuated, thereby introducing an inherent lag into the control system. Yet another disadvantage is that the small flow passages of the pilot stage, which are needed to effect small movements of the main spool, are very sensitive to fluid contaminants.

SUMMARY OF THE INVENTION

Accordingly, it is an object of the present invention to provide a valve which can be designed to achieve various flow rate characteristics. One embodiment of the valve thus incorporates quieting elements for application to noise critical environments. Accordingly, the present invention includes a main spool outlet with arcuately diverging sidewall surfaces whose contours can be modified to produce the desired flow rate characteristics.

It is a further object of the present invention to provide a non-cavitating valve having operating valve characteristics and which avoids the control lags associated with pilot stage control of valve position. A feature of this invention is therefore to provide a main valve spool which is directly coupled to a rotating means.

It is yet another object of the present invention to provide a valve which is capable of effecting rapid changes in fluid flow rates. Accordingly, another feature of the present invention is to provide a diffuser assembly which can be rotated in a direction opposite to that of the main spool, thereby producing rapid changes in the relative position between labyrinthine diffuser passages and the main spool outlet.

The above described objects of the present invention are accomplished by a hydraulic servo mechanism comprising a casing defining a chamber, a discharge port in fluid communication with the chamber, and a central axis of rotation extending axially therethrough.

First and second end walls close respective ends of the chamber and define respective bores therethrough which are coaxial with the central axis. A first shaft extends through the axial bore of the first end wall and defines a flow passage for delivering fluid into the chamber. The first shaft is rotatable about the central axis.

The mechanism further includes means for diffusing the fluid delivered through the flow passage. The diffusing means preferably include a second shaft extending through the axial bore of the second end wall and is rotatable therein about the central axis. A substantially cylindrical member is concentrically attached to the second shaft within the chamber and defines a plurality of closely spaced flow paths.

The flow passage of the first shaft comprises an inlet opening outside the chamber, an outlet opening inside the chamber, and a longitudinal bore in fluid communication therebetween. Preferably, the outlet opening is a groove formed in the peripheral surface of the first shaft, wherein opposing sidewall surfaces of the groove diverge relative to a plane transverse to the central axis to define a wedge shape configuration. Preferably, the opposing sidewall surfaces diverge arcuately such that when the first shaft is rotated by a rotary stepper motor or the like into a first position of widest sidewall divergence, flow through the outlet opening to said discharge port is maximized. When the first shaft is rotated into a second position, such that the groove is no longer aligned with the discharge opening or diffusing means, flow through the outlet opening is prevented. If desired, the curvature of the diverging sidewalls may be selected so that the flow rate through the outlet opening is directly proportional to the angular position of the first shaft.

For more rapid response in stopping flow through the discharge port, a rotary stepper motor preferably rotates the second shaft between a first position, whereat all of the flow paths are in fluid communication with the outlet port, and a second position, whereat flow through at least one of the flow passages is obstructed by the casing. The cylindrical member comprises a plurality of parallel plates, wherein each adjacent pair of plates defines one of the closely spaced flow paths therebetween. Preferably, the parallel plates extend parallel to the central axis (longitudinally). The surface of each plate preferably includes at least one projection thereon for defining a labyrinthine flow path between the adjacent plates.

DETAILED DESCRIPTION OF THE INVENTION

Figure 1:
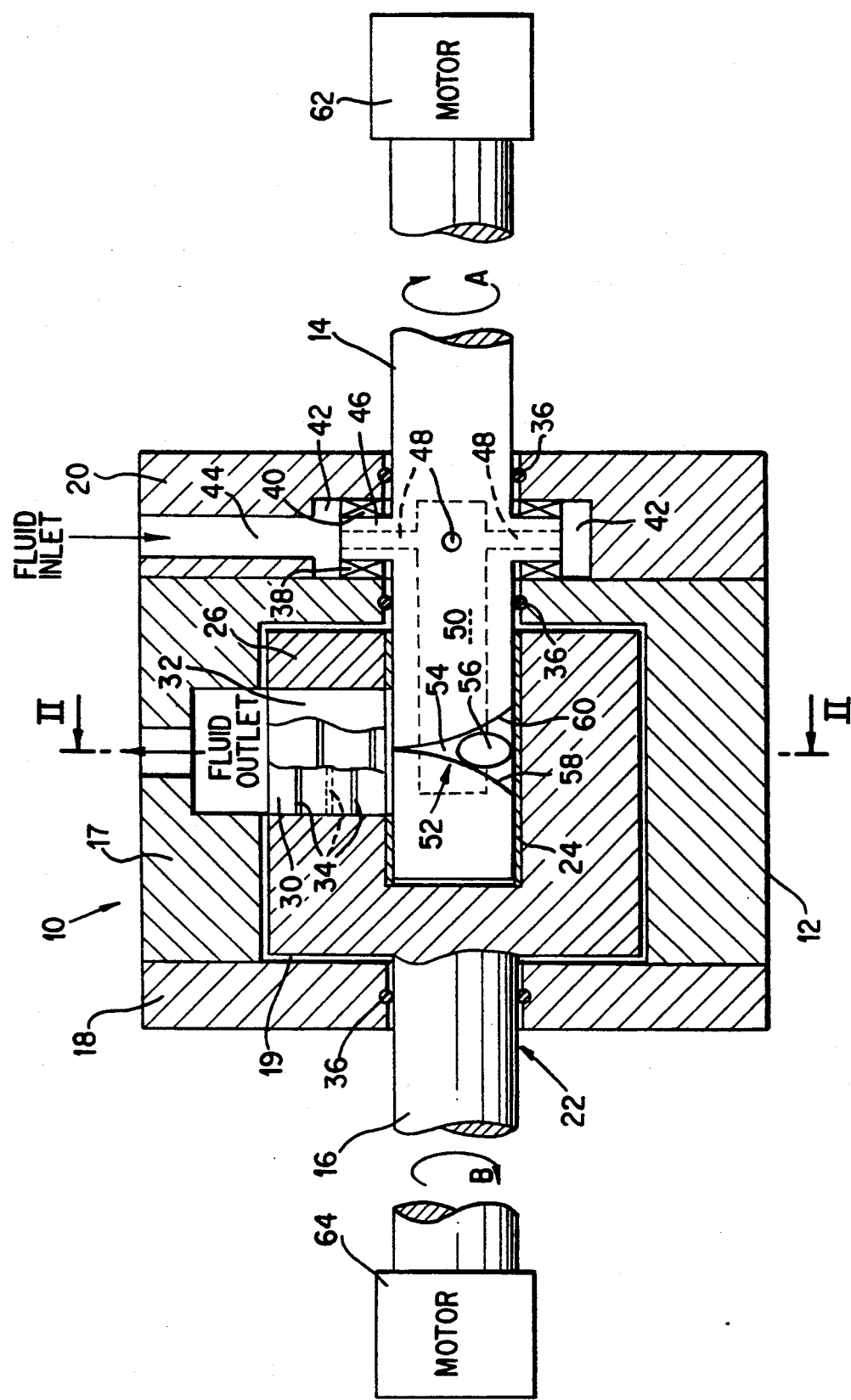
FIG. 1 is a diagrammatic representation of a non-cavitating rotary hydraulic servo or throttle valve mechanism constructed in accordance with the present invention.

Referring now to FIG. 1, which shows one embodiment of the non-cavitating rotary servo or throttle valve mechanism according to the present invention, the mechanism 10 comprises a housing 12, and a rotating valve spool 14 and a diffuser shaft 16, both of which pass axially through the center part of the housing 12. The housing 12 comprises a central portion 17 which is machined to define a central chamber 19 and which is tightly sealed by end walls 18 and 20 fitted at respective ends of the central portion. A diffuser assembly 22 is secured to the end of diffuser shaft 16 and is positioned within chamber 19.

Figure 2:
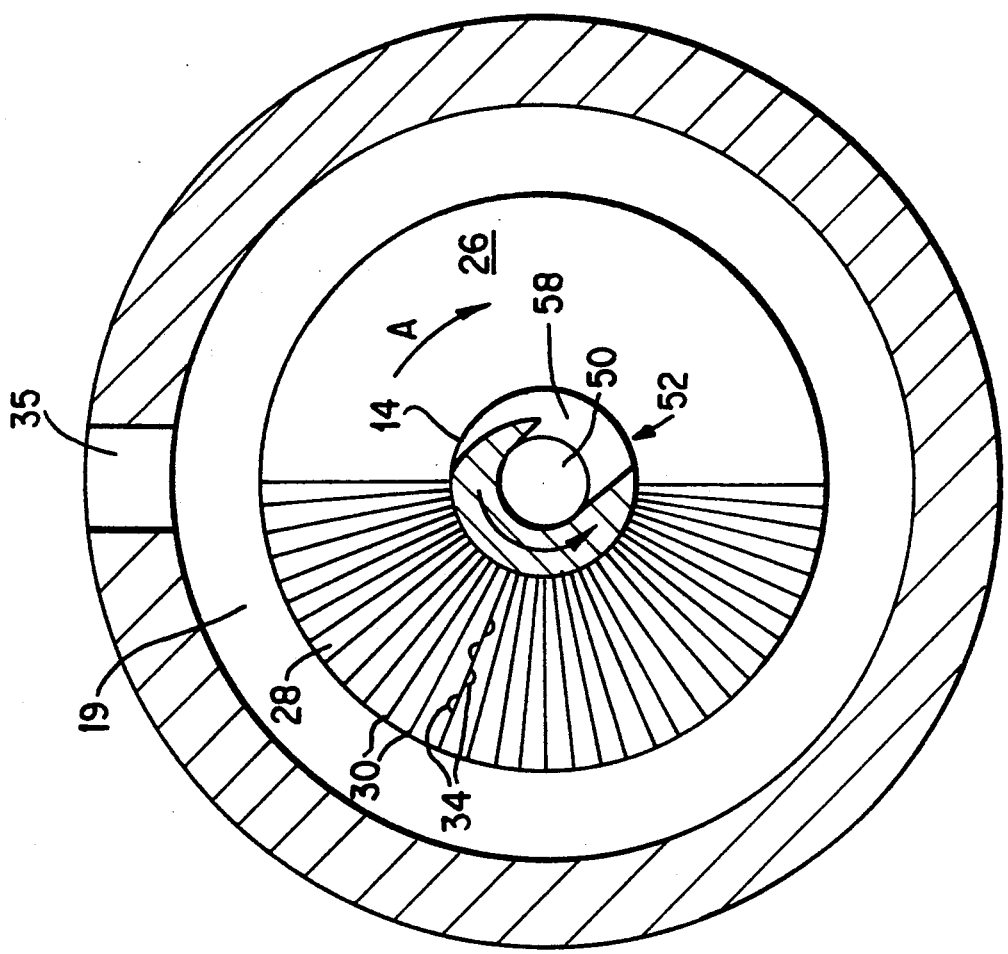
FIG. 2 is a cross sectional view of the servo mechanism shown in FIG. 1 above, taken along the plane II—II.

An axial opening in the diffuser assembly 22 is dimensioned to receive the end of spool 14. The interior surface of the diffuser assembly is preferably provided with a lining 24 which engages the outer periphery of spool 14 to permit smooth rotation thereof and an oil tight seal therebetween. To prevent cavitation of fluid to be delivered by valve spool 14, diffuser assembly 22 preferably comprises a substantially cylindrical member 26 which is attached at its base to diffuser shaft 16 and which defines a plurality of labyrinthine flow passages 28 extending through its side walls. As shown in FIGS. 1 and 2, the flow passages may be formed by a plurality of closely spaced plates 30 longitudinally arranged relative to cylindrical member 26 within an opening 32 in the cylinder sidewall. Although the opening 32 may be dimensioned and shaped as desired, as shown in FIG. 2 it is preferably C-shaped in a transverse plane so that approximately 50 percent of the peripheral surface of spool 14 is exposed to the flow passages. To further facilitate labyrinthine flow, plates 30 may be provided with longitudinal projections 34. It is contemplated that other conventional means of providing labyrinthine flow through opening 32 might instead be utilized. As will be explained more fully below, fluid passing through opening 32 leaves mechanism 10 through a discharge port 35 extending through the wall of central housing portion 17.

As shown in FIG. 1, conventional elastomeric O-rings 36 may be used between the diffuser shaft or valve spool and respective housing components to further prevent leakage between elements or pressure boundaries. A set of thrust bearings 38 and 40 are preferably incorporated between spool 14 and the housing to balance any hydraulic forces which may develop during operation of the valve mechanism. While the valve is shown with one internal port 54, the inner spool 14 may be equipped with multiple ports either along its length to increase total flow capacity and/or radially around the spool 14 to provide a hydraulic balance to minimize the radial load on the elements.

With continuing reference to FIG. 1, the flow path of hydraulic fluid through the rotary valve spool 14 of the present invention will now be described. To facilitate the delivery of fluid into the valve mechanism 10, end wall 20 defines a cylindrical cavity 42 and an inlet bore 44 in fluid communication therewith. Rotatably received within cavity 42 is an annular collar 46 which is formed on the periphery of spool 14 and which includes at least one inlet opening 48. Although any number of inlet openings may be utilized in annular collar 46, it is preferred that four equiangularly spaced inlet openings be included. Each inlet opening 48 extends from the surface of collar 46 until it reaches axial chamber 50 centrally located within spool 14. It will be apparent to those of ordinary skill in the art that pressurized fluid entering via inlet bore 44 will occupy cavity 42 and enter axial chamber 50 through the spaced inlet openings 48 without regard to the angular position of spool 14 or rotation thereof.

Figure 3:
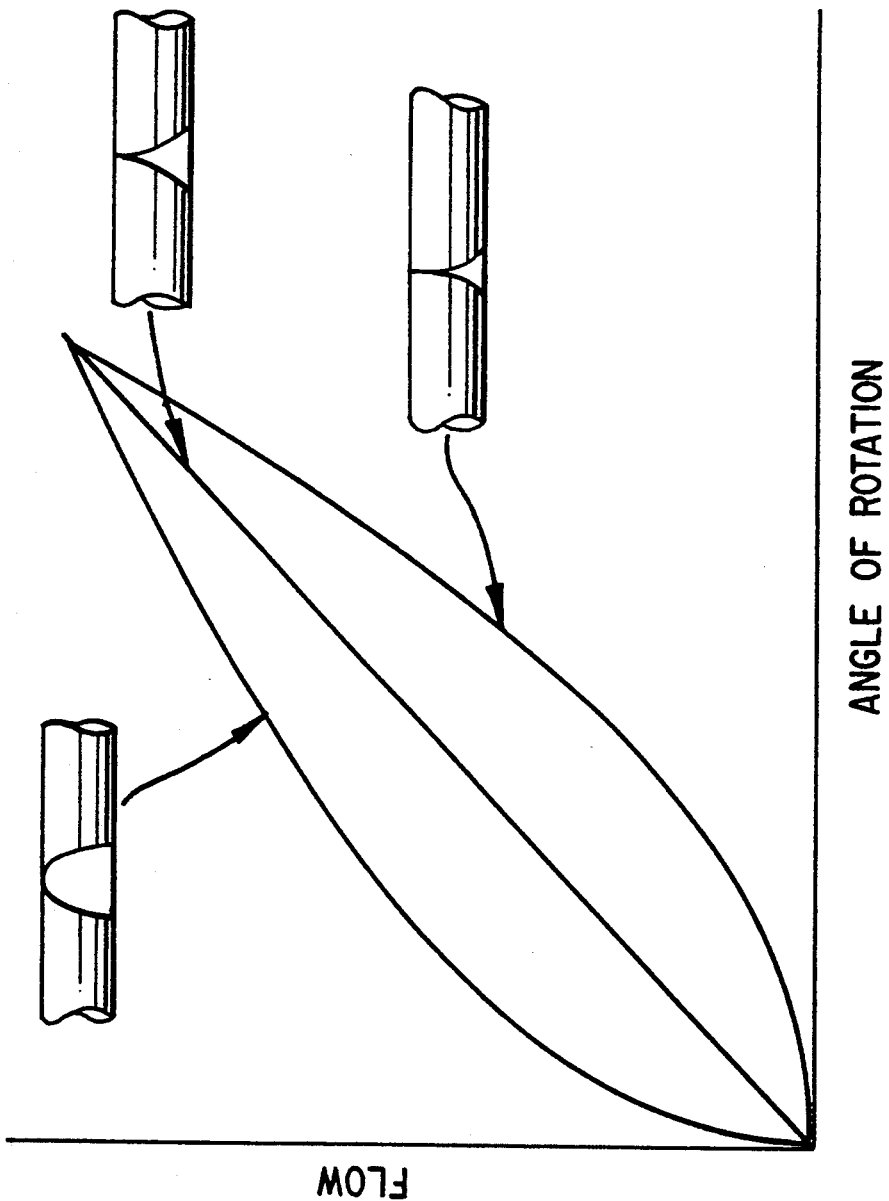
FIG. 3 is a graphical representation showing flow rate characteristics as a function of valve spool angular position for several possible groove sidewall configurations.

Fluid entering inlet openings 48 exits valve spool 14 through an outlet port 52 which is also in fluid communication with axial chamber 50. Outlet port 52 comprises a groove 54 formed in the peripheral surface of spool 14. The base of groove 54 includes an aperture 56 which opens into axial chamber 50. Opposing sidewall surfaces 58, 60 diverge so that groove 54 is substantially wedge shaped. Preferably, sidewalls 58 and 60 diverge arcuately. However, as shown in FIG. 3, the precise curvature of the groove sidewalls may be modified based on empirically obtained data to achieve various valve flow characteristics.

With particular reference to FIG. 2, it should be apparent that the passage of fluid from valve spool 14 to discharge port 35 is controlled by the angular position of the valve spool within diffuser member 26 and by the position of diffuser outlet opening 32 relative to discharge port 35. Any conventional means, such as a handwheel or rotary actuator, may be utilized to rotate the valve spool. Preferably, however, an electronically controlled rotary stepper motor 62 is drivingly coupled to valve spool 14 to effect changes in angular position thereof. A conventional feedback means, such as a rotary shaft encoder, provides a suitable computer interface for direct control of valve actuation, thereby eliminating the lag in operation associated with pilot stage operated valves.

In the position illustrated in FIG. 2, the rotary spool 14 has been rotated by stepper motor 62 so that outlet port 52 is aligned with the solid wall portion of diffuser member 26, thereby preventing flow therethrough. Diffuser opening 32 remains in alignment with discharge port 35. With reference to FIG. 1, as valve spool 14 is rotated in the direction of arrow A, flow therethrough gradually increases until it reaches a maximum point. To achieve even faster changes in flow, diffuser shaft 16 is preferably coupled to a second stepper motor 64 which rotates cylindrical diffuser member 26 in the direction represented by arrow B, which is opposite to that in which spool 14 is rotated.

As stated in the foregoing, the present invention makes it possible to obtain various valve flow characteristics by appropriately selecting the shape of the outlet groove to be provided on the rotary valve spool which constitutes a component part of the control valve of the present invention. It should also be apparent to persons of ordinary skill that the configuration of the diffuser assembly may also be modified. For example, the diffuser itself may remain stationary and may even be made an integral part of the housing itself so that the diffuser shaft and associated cylindrical member is replaced with a housing that includes a fixed orifice defining a plurality of labyrinthine passages in communication with an axial bore that receives the valve spool.

It will otherwise be apparent to those of ordinary skill in the art that various modifications and adaptations of the structure above described will become readily manifest without departure from the spirit and scope of the invention, the scope of which is defined in the appended claims.

What is claimed is:

1. A hydraulic servo-actuating mechanism comprising:
   a casing defining a chamber, a discharge port in fluid communication with said chamber, and a central axis extending axially therethrough;
   a first end wall closing a first axial end of said chamber and defining an axial bore therethrough, said axial bore being coaxial with said central axis;
   a second end wall closing a second axial end of said chamber and defining an axial bore therethrough, the axial bore of the second end wall being coaxial with said central axis;
   a first shaft extending through the axial bore of said first end wall, said first shaft defining a flow passage for delivering fluid into said chamber and being rotatable about said central axis; and
   means for diffusing fluid delivered through said flow passage, said diffusing means including a second shaft extending through the axial bore of said second end wall and being rotatable therein about said central axis, and a substantially cylindrical member being concentrically attached thereto and defining a plurality of closely spaced flow paths.

2. The device of claim 1, wherein the flow passage of the first shaft comprises an inlet opening outside said chamber, an outlet opening inside said chamber, and a longitudinal bore extending therebetween.

3. The device of claim 2, wherein said inlet opening is a groove formed in the peripheral surface of the first shaft and wherein opposing sidewall surfaces of said groove diverge relative to a plane transverse to said central axis.

4. The device of claim 3, wherein said opposing sidewall surfaces diverge arcuately.

5. The device of claim 3, wherein said first shaft is rotatable between a first position, whereat flow through said outlet opening to said discharge port is maximized and a second position, whereat flow through said outlet opening is prevented.

6. The device of claim 2, wherein the flow rate through said outlet opening is directly proportional to the angular position of said first shaft.

7. The device of claim 1, wherein said second shaft is movable between a first position, whereat all of said flow paths are in fluid communication with said outlet port, and a second position, whereat at flow through at least one of said flow passages is obstructed by said casing.

8. The device of claim 1, wherein said cylindrical member comprises a plurality of parallel plates, wherein each adjacent pair of plates defines one of said closely spaced flow paths therebetween.

9. The device of claim 1, wherein said parallel plates extend parallel to said central axis.

10. The device of claim 9, wherein a surface of each plate includes at least one projection for defining a labyrinthine flow path.

11. A hydraulic servo-actuating mechanism comprising:
    a housing defining a chamber and a discharge port in fluid communication with said chamber;
    means for delivering fluid into said chamber, said fluid delivery means being rotatably received within said chamber and defining an inlet opening, a discharge opening; and a flow passage therebetween;
    means between said discharge opening and said discharge port for diffusing pressurized fluid passing therebetween in a non-cavitating manner;
    said fluid delivery means includes a rotating shaft defining an axis of rotation and wherein said outlet opening is a groove formed in a peripheral surface thereof; and
    means for rotating said shaft wherein said means for rotating is a rotary stepper motor.

12. The device of claim 11 wherein opposing sidewall surfaces of said groove diverge relative to a plane transverse to said axis of rotation.

13. The device of claim 12, wherein said opposing sidewall surfaces diverge arcuately.

14. A hydraulic servo-actuating mechanism comprising:
    a housing defining a chamber and a discharge port in fluid communication with said chamber;
    means for delivering fluid into said chamber, said fluid delivery means being rotatably received within said chamber and defining an inlet opening, a discharge opening, and a flow passage therebetween;
    means between said discharge opening and said discharge port for diffusing pressurized fluid passing therebetween in a non-cavitating manner;
    said diffusing means comprises a second shaft rotatably received within said housing and an elongated member secured to an end thereof for rotation in said chamber; and
    said elongated member has a substantially circular cross section corresponding to the interior of said chamber and defines a plurality of closely spaced fluid passages.

15. The device of claim 14 wherein said second shaft is movable between a first position, whereat all of said flow paths are in fluid communication with said outlet port, and a second position, whereat at flow through at least one of said fluid passages is obstructed by said housing.

16. The device of claim 14, further including means for rotating said second shaft into said first and second positions.

* * * * *